United States Patent
Jain

(10) Patent No.: US 8,240,979 B2
(45) Date of Patent: Aug. 14, 2012

(54) GAS TURBINE ENGINE SYSTEMS INVOLVING INTEGRATED FLUID CONDUITS

(75) Inventor: Ashok K. Jain, Tempe, AZ (US)

(73) Assignee: United Technologies Corp., Hartford, CT (US)

( * ) Notice: Subject to any disclaimer, the term of this patent is extended or adjusted under 35 U.S.C. 154(b) by 1054 days.

(21) Appl. No.: 11/923,105

(22) Filed: Oct. 24, 2007

(65) Prior Publication Data

US 2009/0110537 A1 Apr. 30, 2009

(51) Int. Cl.
*F01D 25/24* (2006.01)

(52) U.S. Cl. .......................................... 415/115; 60/266

(58) Field of Classification Search .................. 415/115; 60/266, 267, 30
See application file for complete search history.

(56) References Cited

U.S. PATENT DOCUMENTS

| | | | |
|---|---|---|---|
| 4,155,680 A * | 5/1979 | Linko et al. .................. 415/144 |
| 4,268,221 A | 5/1981 | Monsarrat et al. | |
| 4,312,185 A * | 1/1982 | Nash et al. ...................... 60/739 |
| 4,412,782 A * | 11/1983 | Monsarrat ...................... 415/175 |
| 4,469,596 A | 9/1984 | Kantor | |
| 4,790,502 A | 12/1988 | Saegusa | |
| 4,971,272 A | 11/1990 | Gudridge et al. | |
| 5,003,773 A | 4/1991 | Beckwith | |
| 5,154,578 A * | 10/1992 | Miraucourt et al. ....... 415/173.3 |
| 5,174,110 A | 12/1992 | Duesler et al. | |
| 5,368,069 A | 11/1994 | Felber | |
| 5,378,016 A | 1/1995 | Vollmer et al. | |
| 6,854,487 B2 | 2/2005 | Witemyre et al. | |
| 7,784,528 B2 * | 8/2010 | Ottow et al. .................. 165/169 |
| 2004/0007651 A1 | 1/2004 | Williams et al. | |
| 2007/0006589 A1 | 1/2007 | Muldoon et al. | |

FOREIGN PATENT DOCUMENTS

| | | |
|---|---|---|
| EP | 1696113 | 8/2006 |
| FR | 2534982 | 4/1984 |
| GB | 785491 | 10/1957 |

OTHER PUBLICATIONS

European Search Report mailed Feb. 23, 2009.

* cited by examiner

*Primary Examiner* — Nathaniel Wiehe

(74) *Attorney, Agent, or Firm* — Carlson, Gaskey & Olds, P.C.

(57) ABSTRACT

Gas turbine engine systems involving integrated fluid conduits are provided. In this regard, a representative engine casing for a gas turbine engine includes: a casing wall; and a fluid conduit integrated into the casing wall.

17 Claims, 2 Drawing Sheets

GAS TURBINE ENGINE SYSTEMS INVOLVING INTEGRATED FLUID CONDUITS

BACKGROUND

1. Technical Field

The disclosure generally relates to gas turbine engines.

2. Description of the Related Art

Wing-mounted gas turbine engines typically are mounted within nacelles. In addition to transmitting thrust from the engine to the wing of an aircraft, a nacelle also typically performs other functions such as routing various fluids, e.g., hydraulic fluid and air, and electricity to other portions of the engine and aircraft. Unfortunately, these functions oftentimes result in the nacelle incurring a size penalty. That is, a larger nacelle typically is required in order to accommodate these functions, with the larger nacelle typically resulting in higher aerodynamic drag and associated loss in aircraft performance, e.g., fuel economy.

SUMMARY

Gas turbine engine systems involving integrated fluid conduits are provided. In this regard, an exemplary embodiment of a gas turbine engine comprises: an engine casing having an exterior defined, at least in part, by a casing wall; and a fluid conduit integrated into the casing wall.

An exemplary embodiment of an engine casing for a gas turbine engine comprises: a casing wall; and a fluid conduit integrated into the casing wall.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving integrated fluid conduits are provided, several exemplary embodiments of which will be described in detail. In this regard, some embodiments incorporate fluid conduits that are integrated with casings of the gas turbine engines. By way of example, a fluid conduit (e.g., a bleed air duct, hydraulic line, or fuel line) can be integrated with an exterior casing of the engine, thereby reducing the overall profile of the engine. In this manner, a nacelle used to protect and mount the gas turbine engine may be reduced in size, thereby promoting aerodynamic efficiency of the nacelle. Notably, by integrating a fluid conduit with a casing, a weight reduction also may be achieved as the casing and conduit may share a wall. Additionally, attachment fixtures conventionally used for securing conduit to the exterior of the casing can be omitted in some embodiments.

Figure 1:
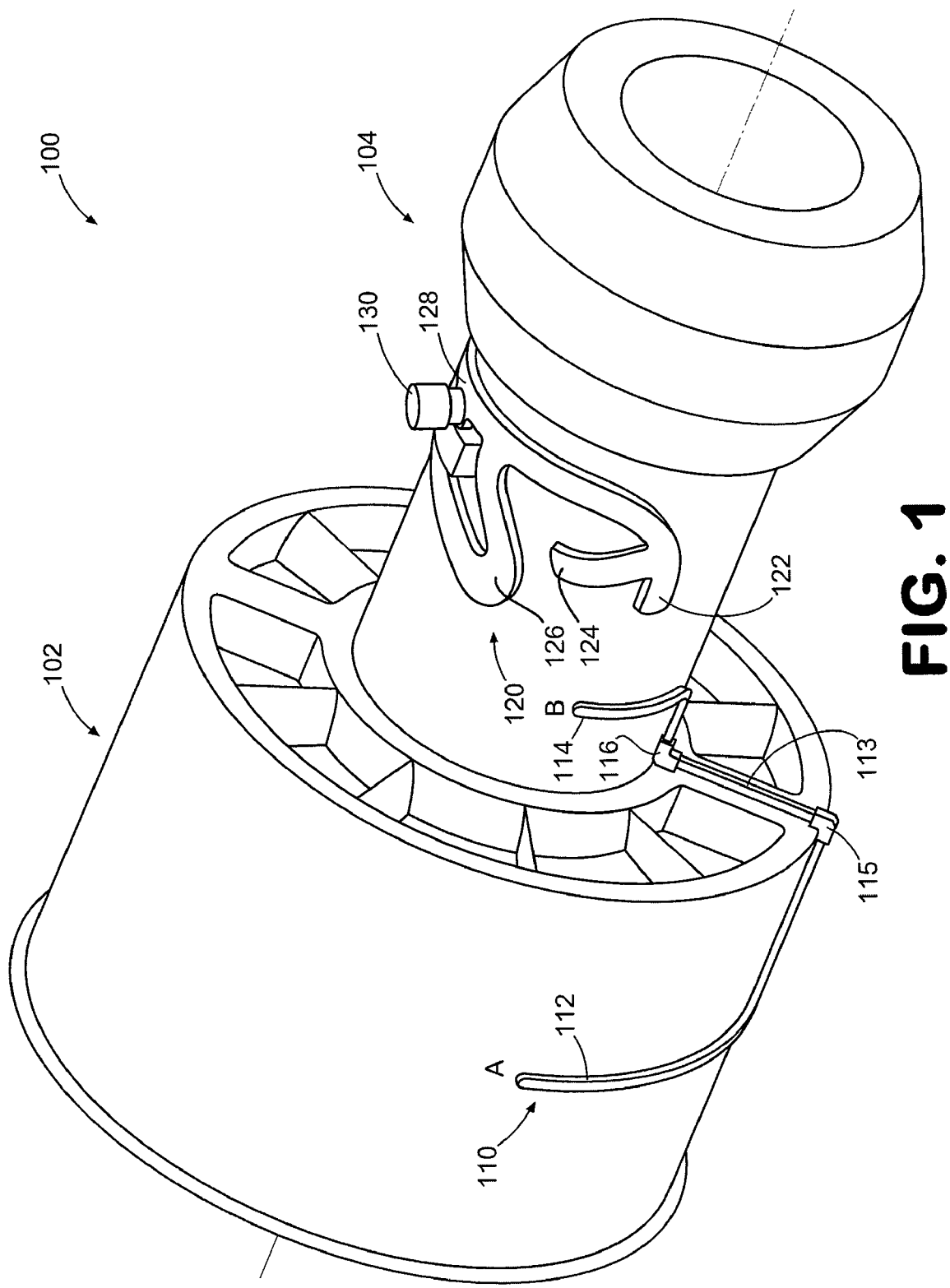
FIG. 1 is a schematic diagram depicting an exemplary embodiment of a gas turbine engine.

In this regard, reference is made to the exemplary embodiment of FIG. 1, which schematically depicts a gas turbine engine 100 configured as a turbofan. Although the embodiment of FIG. 1 is configured as a turbofan, there is no intention to limit the concept described herein to such configurations, as various other configurations of gas turbine engines can be used.

As shown in FIG. 1, engine 100 incorporates a fan casing 102, in which a fan (not shown) is mounted. A high pressure casing 104 is mounted aft of the fan casing. Casing 104 houses a compressor section, a combustion section and a turbine section. In the embodiment of FIG. 1, two representative examples of fluid conduits are shown integrated into the casings of the engine. Specifically, the embodiment of FIG. 1 includes conduit 110 and conduit 120.

Conduit 110 is arbitrarily depicted for routing fluid between a location A (located on the fan casing) and location B (located on the high pressure casing). Specifically, conduit 110 is a multi-segment conduit that incorporates segments 112, 113 and 114, with a fitting 115 interconnecting segments 112 and 113, and a fitting 116 interconnecting segments 113 and 114. From location A, conduit segment 112 extends annularly along a portion of the fan casing, then turns and extends axially along the fan casing and terminates at fitting 115. From fitting 115, segment 113 extends radially inwardly toward the high pressure casing and terminates at fitting 116. Notably, fitting 116 is located at the intersection of the fan casing and the high pressure casing due to manufacturing techniques that form the two casings separately. Thus, it should be understood that integration of a conduit into a casing can accommodate inter-casing runs by using fittings, for example.

Aft of fitting 116, conduit segment 114 extends axially along the high pressure casing and then turns to extend annularly across a portion of the high pressure casing. Since, in some embodiments, conduit 110 is not formed of tubing that is shaped, e.g., bent, to form the various curves required for routing fluids from location A to location B, less conduit may be required. This is because adherence to tubing bend-radius restrictions need not be followed.

In some embodiments, different materials can be used for conduits and/or conduit segments depending, at least in part, upon the range of temperatures to which the conduits and/or segments are to be exposed. For instance, a different material may be used for a segment that spans a relatively high temperature section of a casing. Notably, in those embodiments in which a fluid is routed through a conduit or conduit segment that is exposed to a temperature that is different from the fluid temperature, the conduit or conduit segment can function as a heat exchanger. In some embodiments, such heat exchange functionality may result in a weight savings as a dedicated or larger heat exchange component need not be used.

In contrast to conduit 110, which extends across multiple casings, conduit 120 extends along an exterior of a single casing, i.e., the high pressure casing. In the embodiment of FIG. 1, conduit 120 incorporates multiple segments that are interconnected in a branch structure without the use of intervening fittings. In particular, conduit 120 includes segments 122, 124 and 126 that merge with segment 128. Notably, segment 128 includes a fitting 130 that is used to interconnect with a corresponding fixture of a nacelle, so that fluid (in this case, environmental air) can be provided to the aircraft.

Various techniques can be used for integrating fluid conduit into an exterior of an engine casing. By way of example, representative techniques are depicted schematically in the cross sectional diagrams of FIGS. 2 and 3.

Figure 2:
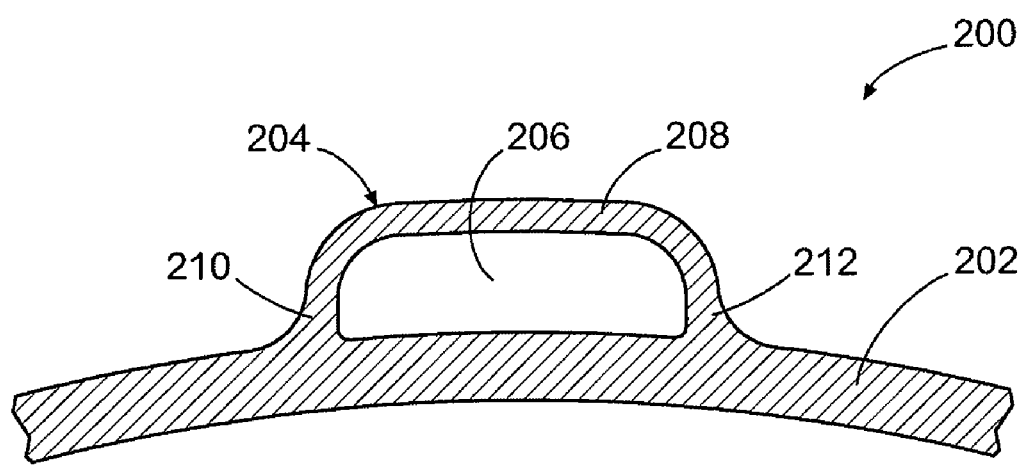
FIG. 2 is a schematic, cross-sectional diagram depicting an exemplary embodiment of an engine casing incorporating an integrated fluid conduit.

As shown in FIG. 2, engine casing 200 incorporates an exterior wall 202. A segment of conduit 204 uses wall 202 to define an interior fluid-routing channel 206. Specifically, fluid-routing channel 206 is defined by a conduit wall 208 and wall 202 of the casing such that the fluid-routing channel is located radially outboard of the wall 202. In this embodiment, terminating ends 210, 212 of the conduit wall are spaced from each other and attached to wall 202 by welding or other attachment methods, such as brazing or soldering. In other embodiments, other integration methods can be used, such as casting the conduit wall and the casing wall together with the channel being created by an expendable core. Notably, in still other embodiments, a complete section of conduit, i.e., conduit that independently defines an interior channel without terminating ends, can be attached directly to a casing without the use of mounting brackets.

Figure 3:
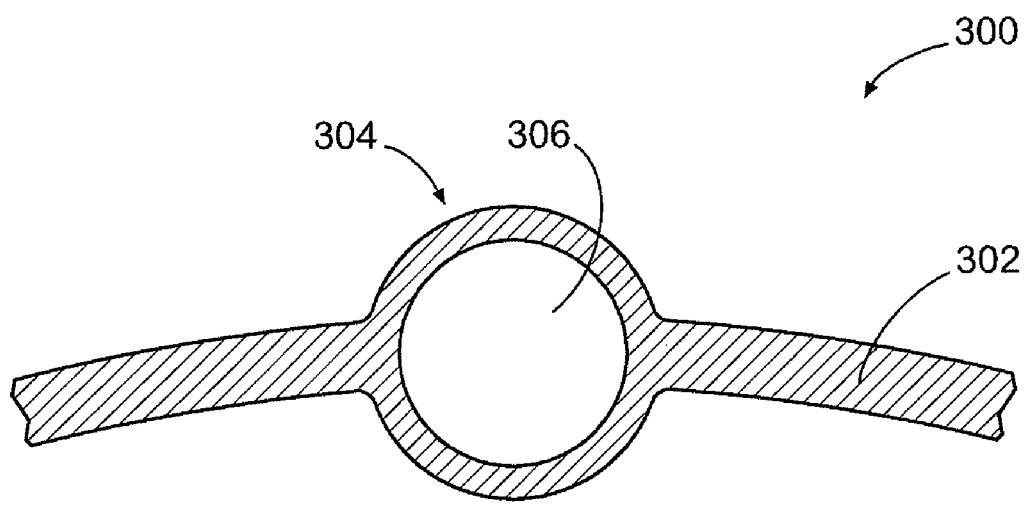
FIG. 3 is a schematic, cross-sectional view of another embodiment of an engine casing incorporating an integrated fluid conduit.

As shown in the embodiment of FIG. 3, engine casing 300 incorporates a discontinuous casing wall 302 that integrates a segment of conduit 304. In contrast to the embodiment of FIG. 2, in which a portion of the casing wall is used for defining a portion of a fluid-routing channel, conduit segment 304 fully defines a fluid-routing channel 306, with conduit segment 304 further forming a structural portion of the casing wall. In some embodiments, such a configuration can be provided by integrally casting the casing and conduit.

Because the conduit is integrated with a casing, vibration induced failures that plague externally mounted conduits can potentially be reduced or eliminated in some embodiments. Design and testing of the conduits also can be simplified by eliminating complex routing issues and natural frequency testing iterations required with external conduits. Additionally, the integrated conduits may improve the heat transfer between the casing and the fluid within the conduit since due to direct proximity.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine comprising:
an engine casing having an exterior defined, at least in part, by a casing wall including a fan casing wall and a high pressure casing wall; and
a fluid conduit integrated into an exterior of the fan casing wall and a portion of the high pressure casing wall.

2. The gas turbine engine of claim 1 wherein:
the fluid conduit comprises a conduit wall; and
a portion of the casing wall and at least a portion of the conduit wall define a fluid-routing channel of the fluid conduit.

3. The gas turbine engine of claim 1 wherein a fluid-routing channel is located radially outboard of the casing wall.

4. The engine of claim 1, wherein the fluid conduit has interconnected multiple segments.

5. The engine of claim 4, wherein a first of the multiple segments is located only on the fan casing and a second of the multiple segments is located only on the high pressure casing.

6. The engine of claim 4, wherein:
the engine further comprises a fitting; and
a first of the multiple segments is interconnected with a second of the multiple segments using the fitting.

7. The engine of claim 4, wherein at least two of the multiple segments are formed in a branch configuration such that the at least two of the multiple segment interconnect without the use of a fitting.

8. The engine of claim 1, further comprising a fitting operative to interconnect the fluid conduit with another conduit for routing fluid to a component remote from the engine.

9. The engine of claim 1, wherein the fluid conduit is operative to route air.

10. The engine of claim 1, wherein the engine is a turbofan gas turbine engine.

11. An engine casing for a gas turbine engine comprising:
a casing wall;
a fluid conduit integrated into the casing wall:
wherein the fluid conduit has interconnected multiple segments and wherein the engine casing further comprises a fitting; and a first of the multiple segments is interconnected with a second of the multiple segments using the fitting.

12. The engine casing of claim 11 wherein the fluid conduit comprises a conduit wall;
a portion of the casing wall and at least a portion of the conduit wall define a fluid-routing channel of the fluid conduit.

13. The engine casing of claim 11, wherein a fluid-routing channel is located radially outboard of the casing wall.

14. The engine casing of claim 11, wherein the engine casing is a high pressure casing.

15. The engine casing of claim 11, wherein:
the engine casing comprises a fan casing and a high pressure casing; and
the fluid conduit extends along a portion of the fan casing and a portion of the high pressure casing.

16. The engine casing of claim 11, wherein the engine casing is a turbofan gas turbine engine casing.

17. An engine casing for a gas turbine engine comprising:
a casing wall;
a fluid conduit integrated into the casing wall;
wherein the fluid conduit has interconnected multiple segments and wherein at least two of the multiple segments are formed in a branch configuration such that the at least two of the multiple segment interconnect without the use of a fitting.

* * * * *